United States Patent [19]

Hashimoto et al.

[11] Patent Number: 4,548,833
[45] Date of Patent: Oct. 22, 1985

[54] METHOD FOR PREPARING A MAGNETIC RECORDING MEDIUM

[75] Inventors: Hiroshi Hashimoto; Tsutomu Okita, both of Shizuoka, Japan

[73] Assignee: Fuji Photo Film Co., Ltd., Kanagawa, Japan

[21] Appl. No.: 461,702

[22] Filed: Jan. 28, 1983

[30] Foreign Application Priority Data

Jan. 28, 1982 [JP] Japan ................... 57-10867

[51] Int. Cl.⁴ .............................................. B05D 3/06
[52] U.S. Cl. ...................................... 427/44; 427/128; 427/130; 427/131; 428/900
[58] Field of Search ................. 427/44, 54.1, 128, 130, 427/131; 428/900

[56] References Cited

U.S. PATENT DOCUMENTS 3,104,983  9/1963  Tarwater et al. ................. 427/44
4,049,566  9/1977  Brilovich et al. ................ 427/128
4,058,646  11/1977 Vaeth et al. .................... 427/128
4,180,597  12/1979 Motz et al. ..................... 427/128
4,394,404  7/1983  Suzuki et al. ................... 427/54.1
4,415,630  11/1983 Kubota et al. ................... 427/44
4,443,490  4/1984  Nakajima et al. ................ 427/44
4,448,846  5/1984  Chang et al. .................... 427/44

FOREIGN PATENT DOCUMENTS 111832  7/1982  Japan .......................... 427/130

Primary Examiner—John H. Newsome
Attorney, Agent, or Firm—Sughrue, Mion, Zinn Macpeak & Seas

[57] ABSTRACT

A method for preparing a magnetic recording medium is disclosed. The method includes providing a support base and a particular coating composition for the base. The composition is comprised of a ferromagnetic powder, a binder containing a compound capable of being polymerized with electron beam irradiation, and a solvent. The composition has apparent viscosity of about 1 to 150 centipoise at a shearing speed of 4000 sec$^{-1}$. After coating the composition on the support base, the coated layer is subjected to magnetic orientation. During orientation or shortly thereafter the coated layer is subjected to electrom beam irradiation and then dried in order to evaporate the solvent. The magnetic recording medium prepared has excellent dispersibility of the ferromagnetic fine powder within the binder, which further provides a smooth surface and excellent electrical properties as well as anti-abrasion properties.

18 Claims, No Drawings

METHOD FOR PREPARING A MAGNETIC RECORDING MEDIUM

FIELD OF THE INVENTION

This invention relates to a method for preparing a magnetic recording medium comprising a support having coated thereon a ferromagnetic particle dispersed in a binder, and more particularly to a method for preparing a magnetic recording medium wherein a ferromagnetic particle is well dispersed and has excellent orientation.

BACKGROUND OF THE INVENTION

A magnetic recording medium having excellent S/N ratio among various magnetic characteristics has been recently demanded with the increase of various usages of a magnetic recording medium. This demand has become particularly strong with a improvement of a video recording tape and an audio recording tape.

A ferromagnetic fine powder is required to have excellent dispersibility and orientation to satisfy the above demand. Therefore, (1) making fine particles of a ferromagnetic powder, (2) adding a dispersing agent (such as a surface active agent), (3) adding a coagulation-preventing agent (such as solid particles) and (4) introducing a powerful dispersing machine have been proposed to improve the dispersibility of a ferromagnetic powder and decrease tape noise.

Even though high dispersibility of the coating composition may be achieved at one point, ferromagnetic fine powder readily coagulates while being dried, and high dispersibility cannot be retained.

Making a coating composition highly viscous and adding a coagulation-preventing agent (e.g., a solid particle) have been somewhat effective, but these methods are not desirable because they are subject to restrictions in view of a filtrating step, a coating step and a size of the solid particles.

It has been proposed that a ferromagnetic fine particles be subjected to magnetic orientation in a coating direction in a strong magnetic field immediately after the coating composition is coated and before the solvent evaporates in order to improve orientation and magnetic characteristics of a ferromagnetic fine powder. However, even though a strong magnet is used, it normally takes 10 seconds or more to dry the solvent. Therefore, while a solvent is drying, orientation is disturbed due to the fluid property of the coating composition which allows free movement of the ferromagnetic fine powder. Accordingly, sometimes orientation disappears. Making a coating composition highly viscous has been proposed as a means of overcoming the above shortcoming. However, this causes another undesirable feature which is that the orientation of the ferromagnetic powder is poor in a magnetic field with normal magnet strength. If a strong magnetic field is used, the coated surface becomes considerably uneven, and noise and dropout increase. If drying speed is increased, the coated surface is disturbed by the wind used for drying.

In accordance with another method as described in Japanese Patent Application OPI No. 164436/82 (corresponding to U.S. patent application Ser. No. 364,346 filed Apr. 1, 1982) the support is coated with a coating composition having dispersed therein a compound capable of being polymerized by electron beam irradiation. Immediately after giving orientation of the ferromagnetic fine powder, the compound is polymerized by electron beam irradiation in the presence of a solvent so as to prevent the ferromagnetic fine powder from coagulation and disturbance of orientation. The solvent is then dried to prepare a coated layer having an even surface and having excellent dispersibility and orientation of the ferromagnetic fine powder.

SUMMARY OF THE INVENTION

The present inventor have attempted to improve the dispersibility and orientation of ferromagnetic fine powder as well as surface smoothness of a magnetic recording medium. Accordingly, they have achieved this invention.

A primary object of this invention is to provide a method for preparing a magnetic recording tape having excellent electrical properties. Another object is to provide a method for preparing a magnetic recording tape having excellent anti-abrasion properties.

The above objects can be achieved by the method which comprises coating on a support a coating composition having dispersed in a solvent a ferromagnetic fine powder and containing a compound capable of being polymerized by electron beam irradiation, conducting orientation to a ferromagnetic powder under undried condition, irradiating the coated layer with an electron beam at the same time or immediately after the orientation, and then drying the solvent to prepare a magnetic recording medium, wherein the coating composition has an apparent viscosity of 1 to 150 centipoise at a shearing speed of 4000 $sec^{-1}$.

DETAILED DESCRIPTION OF THE INVENTION

This invention is further explained as follows. In this method, a coating composition is coated on a support. Electron beam irradiation is conducted immediately after the ferromagnetic powder is subjected to magnetic orientation in a magnetic field. After the irradiation the binder is instantly cured whereby the ferromagnetic fine powder is fixed in place. Accordingly, the ferromagnetic fine powder never coagulates and its orientation is not disturbed. It should be noted that the ferromagnetic powder coagulates and its orientation is disturbed when it is fixed in place by drying the solvent without using electron beam irradiation.

The present inventor noted the above described phenomena and have made efforts to improve orientation, dispersibility of a ferromagnetic fine powder and a surface smoothness using electron beam at the time of magnetic orientation by the magnetic field.

The present inventor have discovered that the orientation and dispersibility of a ferromagnetic fine powder by magnetic orientation is closely related to the fluid characteristic of the coating composition, particularly to the apparent viscosity thereof at a high shearing speed and that the orientation and dispersibility is markedly improved using a coating composition having the apparent viscosity of 1 to 150 centipoise. In the present disclosure, "apparent viscosity" is represented by apparent viscosity at a high shearing speed, 4000 $sec^{-1}$. When a coating composition is highly viscous having the apparent viscosity of not lower than 150 centipoise, the ferromagnetic fine powder can not move freely during magnetic orientation. Accordingly, the degree of orientation is very poor. The lower the apparent viscosity is, the better the degree of orientation is. However, when the apparent viscosity is not higher than 1 centipoise, the ferromagnetic fine powder readily coagulates during magnetic orientation making its electromagnetic properties markedly poor.

In the present invention the apparent viscosity of a coating composition is preferably 1 to 100 centipoise and more preferably 1 to 50 centipoise.

Examples of compounds which are capable of being polymerized by electron beam irradiation include compounds having at least one of carbon-carbon unsaturated bond, such as those having an acryloyl group, an acrylamido group, an allyl group, a vinyl ether group or a vinyl thioether group and unsaturated polyesters. More specifically, examples of such compounds include unsaturated fatty acids such as acrylic acid and 2-butenoic acid, unsaturated polybasic acids such as maleic acid, fumaric acid, 2-butene-1,4-dicarboxylic acid and muconic acid, unsaturated fatty acid amides such as acrylamide, crotonamide, 2-pentenamide and maleinamide, alkyl acrylates such as methyl acrylate, styrene and styrene derivatives such as $\alpha$-methylstyrene and $\beta$-chlorostyrene, and vinyl compounds such as acrylonitrile, vinyl acetate and vinyl propionate. Two or more unsaturated bonds can be also present in a molecule. Examples of such compounds are illustrated in *Light Sensitive Resin Data Collections*, published by Sogo Kagaku Kenkyusho Co., Ltd. pages 235 to 236 (December of 1968). Preferred examples are unsaturated esters of polyol, such as ethylene diacrylate, diethylene glycol diacrylate, glycerol triacrylate, pentaerythritol tetraacrylate and unsaturated esters having an epoxy ring such as glycidyl acrylate, with glycerol triacrylate and pentaerythritol tetraacrylate being particularly preferred. A compound having one unsaturated bond and a compound having two or more unsaturated bonds in a molecule can be mixed.

These compounds can be high polymers. The most preferred compounds have an acrylate group at the end of a main chain or on a side chain. Examples of such compounds are disclosed in A. Vranckem, *Fatipec Congress*, 11 19 (1972). One of those examples is shown below.

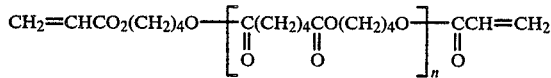

The polyester skelton of the above compound can be a polyurethane skelton, an epoxy resin skelton, a polyether skelton, a polycarbonate skelton or a mixture thereof. An acrylate compound of neopentyl glycol adipate-tolylenediisocyanate condensate is preferably used for the purpose. The molecular weight of the polymers is not stricktly limited but is preferably 1,000 to 20,000. The monmer described above can be mixed with the polymers.

In addition, thermal plastic resins such as vinyl chloride-vinyl acetate type copolymers, cellulose type resins, acetal type resins, vinyl chloride-vinylidene chloride type resins, urethane resins and acrylonitrilebutadiene resin, preferably nitrocellulose and vinyl chloride-vinyl acetate copolymer, may be added alone or in combination into the magnetic coating composition of this invention.

The compound which is capable of being polymerized by an electron beam is preferably present in the ratio of not less than 3 wt%, preferably not less than 5 wt%, more preferably not less than 8 wt% of the binder (an organic substance of a coating composition from which an organic solvent is eliminated). If it is present in an amount less than 3 wt%, there is only a small increase of viscosity or gelation of the coating composition by electron beam irradiation. Therefore, when the ferromagnetic fine powder is subjected to magnetic orientation, it is not sufficiently fixed in place. The binder is preferably contained in an amount of 0.1 to 7 parts by weight, more preferably 0.2 to 0.5 parts by weight, per part by weight of the ferromagnetic fine powder.

Examples of useful ferromagnetic fine powders include a ferromagnetic iron oxide powder, a ferromagnetic chromium dioxide powder and a ferromagnetic alloy powder. Ferromagnetic iron oxide and chromium dioxide powders have acicular ratio of 2/1 to 20/1, preferably not less than 5/1 and an average length of about 0.2 to 20 $\mu$m. A ferromagnetic alloy powder has a metal content of 75 wt% or more and 80 wt% of the metal content is a ferromagnetic metal such as Fe, Co, Ni, Fe-Co, Fe-Ni, Co-Ni, Fe-Co-Ni and the lengthwise diameter is not higher than 1.0 $\mu$m.

To the coating composition of this invention there can be selectively added a solvent such as ketones (e.g., acetone, methyl ethyl ketone, methyl isobutyl ketone, cyclohexanone); esters (e.g., methyl acetate, ethyl acetate, butyl acetate, ethyl lactate, glycol acetate monoethyl ether); ethers and glycol ethers (e.g., glycol dimethyl ether, glycol monoethyl ether and dioxane); aromatic hydrocarbons (e.g., benzen, toluene and xylene); and chlorinated hydrocarbons (e.g., methylene chloride, ethylene chloride, carbon tetrachloride, chloroform, ethylene chlorohydrin and dichlorobenzene).

Additionally, to the coating composition of this invention there can be added lubricants, abrasive agents, anti-corrosive agents and antistatic agents. Examples of useful lubricants include saturated and unsaturated higher fatty acids, esters of fatty acids, higher fatty acid amides, higher alcohols, silicone oils, mineral oils, edible oils and fluorine type compounds. These additives can be added when preparing a coating composition. In the case, a ferromagnetic fine powder and the above additives are simultaneously combined or separately added to a kneading machine to prepare a coating composition. A dispersing agent can be also dispersed with a ferromagnetic fine powder beforehand, and then a compound capable of being polymerized by an electron beam and a thermally plastic resin can be added. Alternatively, the additives can be coated or sprayed on a surface of a magnetic coating layer with or without an organic solvent after drying or after smoothening treatment.

In order to knead and disperse the compositions, various kneading machines can be used such as two-roll mill, ball mill, sand grinder, disperser, high speed impeller disperser, high speed mixer homogenizer. The coating composition obtained is measured by a double cylinder type or a cone-play type rotation viscometer, a capillary viscometer or other viscometers. It is necessary that the coating composition has the apparent viscosity of 1 to 150 centipoise, preferably 1 to 100 centipoise, and more preferably 1 to 50 centipoise.

Examples of method for coating the coating composition on a support include doctor coating, blade coating, core knife coating, squeeze coating, reverse roll coating and gravure coating.

A magnetic coating layer is coated to have a dry thickness of about 0.5 to 15 $\mu$m. The dry thickness is determined based on usages, formulations and required standards.

Magnetic orientation of a ferromagnetic powder is conducted under the following conditions. An alternating current or a direct current of 500 to 3000 Oe is used as the magnetic field. The direction of orientation of the ferromagnetic powder is determined by usages. For instance, with a sound tape, a small type video tape, and a memory tape, orientation is conducted in the direction of tape winding. With a video tape for broadcasting, orientation is conducted in the direction of the tape having an angle of 30° to 90° toward the tape winding.

Orientation is conducted with an permanent magnet, a solenoid coil, and a magnetic blade. The method of orientation is disclosed in U.S. Pat. Nos. 1,949,840, 2,796,359, 3,001,891, 3,172,776, 3,416,949 and 3,473,960 incorporated herein by reference to disclose methods of orientation) and Japanese Patent Publication Nos. 3427/57, 28368/64, 23624/65, 23625/65, 13181/66, 13043/73 and 39722/73.

Examples of electron beam accelerators include a Van de Graaff scanning accelerator, a double scanning accelerator or a curtain beam accelerator. The curtain beam accelerator is preferred in that a high output is obtained at a comparatively low cost. The electron beam used has an accelerating voltage of 100 to 1000 kV, preferably 150 to 300 kV. The absorbed dose is 0.5 to 20 megarads, and preferably 2 to 10 megarads. An accelerating voltage of not higher than 100 kV results in insufficient energy transmission, and the voltage of higher than 1000 kV reduces the efficiency necessary for polymerization and thus is not economical. If the absorbed dose is not higher than 0.5 magarad, curing is not sufficient to attain high strength, and if the absorbed dose is not lower than 20 megarads, energy is not efficiently used for curing, or the object to be irradiated generates heat, for instance, a plastic support generates heat to be deformed.

The steps from orientation of a ferromagnetic powder to electron beam irradiation must be finished while the coating composition retains its fluidity and the solvent has not completely evaporated. Electron beam irradiation is preferably carried out within 5 seconds after magnetic orientation is conducted. It is more preferable to carry out the irradiation within 1 second. Magnetic orientation can be conducted simultaneously with electron beam irradiation.

The drying temperature of the magnetic coating layer is about 50° to 120° C., preferably 70° to 100° C., and more preferably 80° to 90° C. The amount of air supplied for drying is 1 to 5 Kl/m² and more preferably 2 to 3 Kl/m². The drying time is about 10 sec. to 10 min. and preferably 20 sec. to 5 min.

Smoothening with a calender can be conducted, if necessary, in a conventional manner.

Calendering between two mirror plane rolls or between a mirror plane roll and an elastic roll may be carried out to smooth the surface of the magnetic coating layer. An example of a mirror roll is a metal roll, and an example of an elastic roll is a cotton roll or a synthetic resin roll (e.g., nylon, and polyurethane).

Pressure between rolls during calendering is about 25 to 100 Kg/cm², and the temperature is maintained at about 10° to 150° C., preferably about 10° to 100° C. Calendering is preferably done with 1 to 30 rolls at a speed of 5 to 200 m/min. If the temperature and the pressure are above the upper limitation, the magnetic coating layer readily strips off or the support is deformed. If the calendering speed is not higher than about 5 m/min, smoothening is not efficiently carried out, and if the speed is not lower than about 200 m/min., handling becomes difficult.

Smoothening with a mirror plane is carried out after the organic solvent is completely or partially removed from the coated layer of the support in this invention. For example, smoothening may be carried out after an organic solvent is totaly or partially removed by drying the coating layer under normal conditions.

Examples of useful supports include polyesters such as polyethylene terephthalate and polyethylene-2,6-naphthalate: polyolefines such as polyethylene and polypropylene; cellulose derivatives such as cellulose triacetate; plastics such as polycarbonate, polyimide and polyamidoimide; non-magnetic metals such as aluminum, copper, tin and zinc, and non-magnetic alloys containing them; paper and a paper laminated with or coated with polyolefines.

Non-magnetic supports used may be in the form of a film, a tape, a sheet, a disc, a card, or a drum and the material can be selected depending on the forms.

In this invention, the support can be provided with a backcoat on the side opposite that having the magnetic layer coated thereon for purposes such as antistatic characteristics, transferring prevention, wow flutter prevention, improving the strength of the magnetic recording medium and matting the back side.

In accordance with the invention, a magnetic recording medium having surprisingly excellent electrical properties can be obtained.

This invention is further explained in detail with the following examples and comparative examples. In the examples and comparative examples, all part are by weight.

| Example 1 | |
|---|---|
| $\gamma$-$Fe_2O_3$ | 100 parts |
| Urethane acrylate oligomer | 25 parts |
| (number average molecular weight: 3,000) | |
| Methl ethyl ketone | 200 parts |
| Carbon black | 8 parts |
| Trimethoxyacryloyloxy silane | 2 parts |
| ("KBM 1003" manufactured by Shinetsu Kagaku) | |

A magnetic coating composition were prepared by keading the above composition in a ball mill for 50 hours. The magnetic coating composition was measured by a double cylinder type rotation viscometer and it was found that the apparent viscosity at 25° C., shearing speed 4000 sec$^{-1}$ was 6 centipoise. The coating composition was coated on a polyethylene terephthalate support having a thickness of 20$\mu$ to have a dry thickness of 8$\mu$ using a doctor blade. The coating was subjected to orientation using a cobalt magnet (3,000 Oe), and then within 1 second was subjected to electron beam irradiation at accelerating voltage of 165 kV and beam current of 5 mA to have absorbed dose of 5 megarads. Then the solvent was dried for 1 minute at 100° C.

| Example 2 | |
|---|---|
| $\gamma$-$Fe_2O_3$ | 100 parts |
| Acrylate compound of ester type polyurethane resin | 25 parts |
| (number average molecular weight: about 20,000) | |
| Methyl ethyl ketone | 200 parts |
| Carbon black | 8 parts |

-continued

| Example 2 | |
| --- | --- |
| Trimethoxyacryloyloxy silane ("KBM 1003") | 2 parts |

The same procedure as in Example 1 was repeated using the above composition. The apparent viscosity was 47 centipoise.

| Example 3 | |
| --- | --- |
| $\gamma$-$Fe_2O_3$ | 100 parts |
| Acrylate compound of ester type polyurethane resin (number average molecular weight: about 30,000) | 25 parts |
| Methyl ethyl ketone | 200 parts |
| Carbon black | 8 parts |
| Trimethoxyacryloyloxy silane ("KBM 1003") | 2 parts |

The same procedure as in Example 1 was repeated using the above composition. The apparent viscosity was 88 centipoise.

| Example 4 | |
| --- | --- |
| $\gamma$-$Fe_2O_3$ | 100 parts |
| Acrylate compound of ester type polyurethane resin (number average molecular weight: about 30,000) | 25 parts |
| Methyl ethyl ketone | 185 parts |
| Carbon black | 8 parts |
| Trimethoxyacryloyloxy silane ("KBM 1003") | 2 parts |

The same procedure as in Example 1 was repeated using the above composition. The apparent viscosity was 140 centipoise.

| Comparative Example 1 | |
| --- | --- |
| $\gamma$-$Fe_2O_3$ | 100 parts |
| Acrylate compound of ester type polyurethane resin (number average molecular weight: about 20,000) | 25 parts |
| Methyl ethyl ketone | 150 parts |
| Carbon black | 8 parts |
| Trimethoxyacryloyloxy silane ("KBM 1003") | 2 parts |

The same procedure as in Example 1 was repeated using the above composition. The apparent viscosity was 165 centipoise.

| Comparative Example 2 | |
| --- | --- |
| $\gamma$-$Fe_2O_3$ | 100 parts |
| Acrylate compound of ester type polyurethane resin (number average molecular weight: about 30,000) | 25 parts |
| Methyl ethyl ketone | 150 parts |
| Carbon black | 8 parts |
| Trimethoxyacryloyloxy silane ("KBM 1003") | 2 parts |

The same procedure as in Example 1 was repeated using the above composition. The apparent viscosity was 210 centipoise.

Squareness ratios (Br/Bm) of the samples were measured and the results are shown in Table 1.

TABLE 1

| | apparent viscosity (centipoise) | squareness ratio |
| --- | --- | --- |
| Example 1 | 6 | 0.87 |
| Example 2 | 47 | 0.86 |
| Example 3 | 88 | 0.82 |
| Example 4 | 140 | 0.77 |
| Comparative Example 1 | 165 | 0.73 |
| Comparative Example 2 | 210 | 0.73 |

It is clearly seen from the results that the squareness ratio markedly increases as the apparent viscosity of a magnetic coating solution decreases. Therefore a magnetic recording medium having excellent electrical properties can be produced according to the present invention.

While the invention has been described in detail and with reference to specific embodiment thereof, it will be apparent to one skilled in the art that various changes and modifications can be made therein without departing from the spirit and scope thereof.

What is claimed is:

1. A method for preparing a magnetic recording medium, comprising the steps of:
    providing a support base;
    providing a coating composition comprising a ferromagnetic fine powder, a binder containing a compound capable of being polymerized with electron beam radiation, and a solvent, the composition having an apparent viscosity of 1 to 150 centipoise at a shearing speed of 4000 $sec^{-1}$;
    coating the composition on a surface of the support base to form a coated layer;
    subjecting the coated layer to magnetic orientation while the coated layer is still wet;
    irradiating the coated layer with an electrom beam; and
    drying the coated layer to evaporate the solvent.

2. A method for preparing a magnetic recording medium as claimed in claim 1, wherein the coated layer is irradiated with the electron beam within 5 minutes or less after being subjected to the magnetic orientation.

3. A method for preparing a magnetic recording medium as claimed in claim 1, wherein the coated layer is being subjected to the magnetic orientation at the same time it is being subjected to irradiation with the electron beam.

4. A method for preparing a magnetic recording medium as claimed in claim 1, wherein the binder of the coating composition is comprised of 3% by weight or more of the compound capable of being polymerized with electron beam irradiation.

5. A method for preparing a magnetic recording medium as claimed in claim 4, wherein the binder is comprised of 5% by weight or more of the compound capable of being polymerized with electron beam irradiation.

6. A method for preparing a magnetic recording medium as claimed in claim 5, wherein the binder is comprised of 8% by weight or more of the compound capable of being polymerized with electron beam irradiation.

7. A method for preparing a magnetic recording medium as claimed in claim 1, wherein the coating composition is comprised of the binder in an amount of 0.1 to 7 parts by weight per part by weight of the fine magnetic powder.

8. A method for preparing a magnetic recording medium as claimed in claim 7, wherein the coating composition is comprised of a binder in an amount of 0.2 to 0.5 parts by weight per part by weight of the fine magnetic powder.

9. A method for preparing a magnetic recording medium as claimed in claim 1, wherein the apparent viscosity of the coating composition is 1 to 100 centipoise at a shearing speed of 4000 $sec^{-1}$.

10. A method for preparing a magnetic recording medium as claimed in claim 9, wherein the apparent viscosity of the coating composition is 1 to 50 centipoise at a shearing speed of 4000 $sec^{-1}$.

11. A method for preparing a magnetic recording medium as claimed in claim 1, wherein the dried coated layer has a thickness of from 0.5 to 15 μm.

12. A method for preparing a magnetic recording medium as claimed in claim 1, wherein the electron beam has an accelerating voltage of 100 to 1000 kV.

13. A method for preparing a magnetic recording medium as claimed in claim 12, wherein the electron beam has an accelerating voltage of 150 to 300 kV.

14. A method for preparing a magnetic recording medium as claimed in claim 1, wherein the drying is carried out at a temperature of 50° to 120° C.

15. A method for preparing a magnetic recording medium as claimed in claim 14, wherein the drying is carried out at a temperature of 70° to 100° C.

16. A method for preparing a magnetic recording medium as claimed in claim 15, wherein the drying is carried out at a temperature of 80° to 90° C.

17. A method for preparing a magnetic recording medium as claimed in claim 1, further comprising the step of:
    calendering the dried coated layer between calendering rollers.

18. A method for preparing a magnetic recording medium as claimed in claim 17, wherein the calendering is carried out by applying a pressure of 25 to 100 $Kg/cm^2$ at a temperature of about 10° to 100° C.

* * * * *